July 6, 1926.
P. J. O'NEILL
1,591,139
NOTE SHEET FOR PLAYER PIANOS
Original Filed Jan. 15, 1923
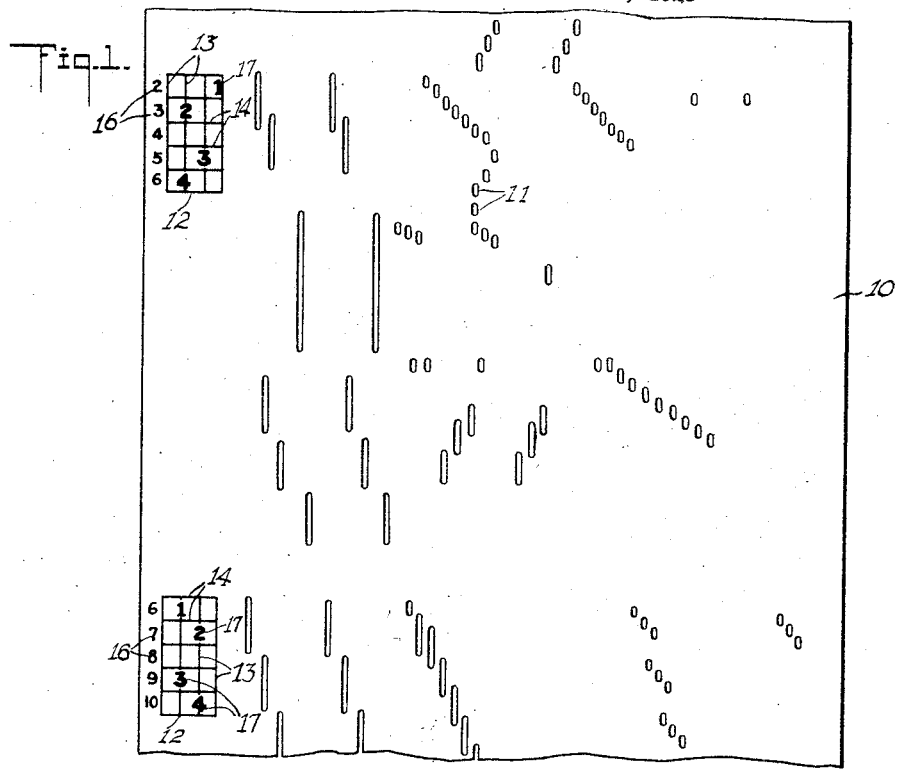
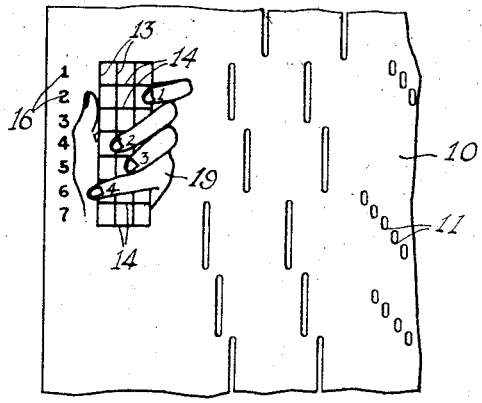
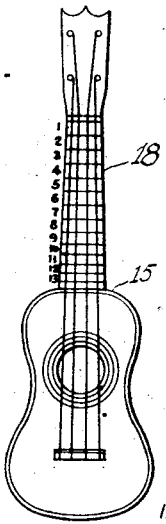
WITNESSES
Frederick Diehl.
Hugh H. Ott
INVENTOR
PETER J. O'NEILL
BY
ATTORNEYS Patented July 6, 1926.

1,591,139

UNITED STATES PATENT OFFICE.

PETER J. O'NEILL, OF NEW YORK, N. Y.

NOTE SHEET FOR PLAYER PIANOS.

Application filed January 15, 1923. Serial No. 612,755. Renewed February 6, 1926.

This invention has relation to musical instruments and has particular reference to means combined with the note sheet of a player piano for facilitating the playing of a stringed instrument as an accompaniment therefor.

The principal object of the present invention resides in the provision of means inscribed on the note sheet for indicating the proper positioning of the fingers on the neck of a stringed instrument such as a ukulele, guitar, banjo or the like, which means coincides with the chords as they are played by the note sheet.

As a further object the invention contemplates a finger positioning chart for stringed instruments which is associated with a perforated note sheet for player pianos whereby persons unskilled in the playing of such instruments and with the reading of notes may readily learn to play chords for accompanying a player piano.

As a further object the invention contemplates a simple and inexpensive method of self-instruction for facilitating the playing of stringed instruments in connection with player pianos.

With the above recited and other objects in view, the invention resides in the novel construction, combination and arrangements of parts set forth in the following specification, illustrated in the accompanying drawing and particularly pointed out in the appended claim.

In the drawing—

Figure 1 is a face view of a portion of the note sheet for a player piano equipped with a finger positioning chart constructed in accordance with the invention.

Fig. 2 is a similar view of a slightly modified form of the same.

Fig. 3 is a face view of a ukulele.

Referring to the drawing by characters of reference, 10 designates a note sheet having the usual perforations 11 therein adapted to cooperate with the tracker bar of a player piano for operating the same. Adjacent one side edge of the note sheet and coinciding with the chords which are played thereby, finger positioning charts 12 are inscribed which consist of longitudinal lines 13 representing the strings and transverse lines 14 representing the frets. For the purpose of familiarizing the player of the ukulele 15 or other similar instrument, the portions of the strings which lie between adjacent frets are numbered or otherwise provided with indicia 16 on the chart. In the first embodiment of the invention as illustrated in Fig. 1, the fingers are designed to be represented by indicia 17 such as numerals which are placed at the various points on the chart on which the fingers are supposed to be positioned on the neck 18 of the instrument, preferably by numerals 1, 2, 3 and 4 corresponding to the first, second, third and fourth finger.

As a modified adaptation of this idea the representation of a hand 19 as illustrated in Fig. 2 with the fingers in proper position on the chart, may be employed.

In use and operation, the player piano is operated in the ordinary manner, while the player of the stringed instrument notes the finger positioning charts 12 and correspondingly positions on the stringed instrument to play the chords in unison with the playing of the chords on the player piano. By this means and under this method, persons having an extremely limited knowledge of music may rapidly learn to play a ukulele, banjo, guitar or other similar stringed instruments as an accompaniment for player pianos.

I claim:

A note sheet for player pianos having perforations therein and marks inscribed on said sheet for indicating the positioning of the fingers as to the strings and frets of a stringed instrument to facilitate the playing of said instrument when accompanying the piano.

PETER J. O'NEILL.